United States Patent

Philipson, Jr.

[15] 3,703,628

[45] Nov. 21, 1972

[54] SYSTEM FOR DOCUMENT CODING AND IDENTIFICATION

[72] Inventor: Herman L. Philipson, Jr., Dallas, Tex.

[73] Assignee: Recognition Equipment Incorporated, Dallas, Tex.

[22] Filed: March 29, 1971

[21] Appl. No.: 129,164

Related U.S. Application Data

[63] Continuation of Ser. No. 618,923, Feb. 27, 1967, abandoned

[52] U.S. Cl. ..........235/61.9 R, 340/146.3 Z, 346/75

[51] Int. Cl. .......G01d 15/18, G06k 7/10, G06k 9/18

[58] Field of Search....340/146.3 Z, 146.3 AH, 146.3 MA; 346/75; 235/61.11 E, 61.12 R, 61.12 N

[56] References Cited

UNITED STATES PATENTS

| | | | |
|---|---|---|---|
| 3,100,834 | 8/1963 | Demer | 235/61.12 M |
| 3,486,006 | 12/1969 | Siegel | 235/61.11 E |
| 3,281,860 | 10/1966 | Adams et al. | 346/75 |
| 3,408,482 | 10/1968 | Busby | 235/61.7 R |

FOREIGN PATENTS OR APPLICATIONS

| | | |
|---|---|---|
| 1,059,086 | 2/1967 | Great Britain |

*Primary Examiner*—Maynard R. Wilbur
*Assistant Examiner*—Thomas J. Sloyan
*Attorney*—Richards, Harris and Hubbard, V. Bryan Medlock, Jr. and Harold E. Meier

[57] ABSTRACT

Method and apparatus for sensing human readable intelligence bearing indicia on documents with high resolution, by generating primary signals representatives of said indicia with translation thereof into simplified bar code, printing the simplified code on the document itself, preferably during continuous travel thereof, and sensing the simple bar code for further handling in sorting and in processing of the data imprinted on the document.

12 Claims, 5 Drawing Figures

INVENTOR
HERMAN L. PHILIPSON, JR.

ATTORNEY

INVENTOR

HERMAN L. PHILIPSON, JR.

D. Carl Richards

ATTORNEY

SYSTEM FOR DOCUMENT CODING AND IDENTIFICATION

RELATED APPLICATIONS:

This is a continuation of application Ser. No. 618,923, filed Feb. 27, 1967.

FIELD OF THE INVENTION:

This invention deals particularly with improved reading of visual data of relatively complex nature, such as Arabic numerals, alphabetic characters, technical symbols, etc., from a document and forming in a relatively simple code, e.g., a bar code, the visual data so read, or as much of it as is needed, on the same document. The bar coded symbols can be used conveniently for repetitive sorting and tabulating operations. This involves machine reading the original data and recasting it in a simplified form as to be read by apparatus less expensive than that required to read the complex form. Convenience in use, for example, in higher speed sorting, is especially desirable or essential in order to recycle or to classify and subclassify in repeated passes through a sorter with minimum expense.

THE PRIOR ART:

Various systems have been devised in the past for electronic data reading, sorting and other processing of documents containing human readable intelligence bearing indicia. Various improvements have been made in optical reading equipment in recent years. Some reading devices are adapted to sense and interpret relatively complex data on documents, which data may then be employed for sorting, classifying, and subclassifying the documents, compiling information therefrom, etc. In the field of credit billing on a large scale, for example, numerous credit card charge slips and the like are processed in this manner. Cost of the system generally increases with the handling rates and reading accuracy of the equipment. Improvements in these factors are needed.

An important problem, which is commonly encountered with large and expensive reading and classifying systems, is that of repeated sorting and classification of large quantities of documents. The documents must be passed repeatedly through the complex reading apparatus. For example, on sales slips for credit card operations, in which the slips for a particular customer must be collated and summarized periodically, and returned to the customer, along with the billing, some speed limiting problems are involved. A normal procedure employed to put such items in sequential order, customer order, or otherwise to classify them, is to sort them first into ten pockets, based on a unit digit of a control or identifying number. The ten stacks so collated are then picked up one by one and sorted again on the tens digit, and so forth. This procedure has the disadvantage of requiring as many passes of cards through the machine as there are digits in the reference number. Thus, if an eight-digit number is used to identify the document, eight passes of the complete stack of documents through the machine may be required for complete classification and/or data compilation.

The presently available reading equipment which employs optical sensing is extremely costly. Some substantial difficulties, giving rise to delay or errors, may be encountered when optical or retina-type sensing systems, capable of reading Arabic numerals and also alphabetical data, are employed in recycling operations. Frequently some of the printed data are small or vary in character size. Some of the characters may be blurred, smeared or smudged or otherwise of poor quality. Equipment of high resolving power, generally capable of separating spuriously marked, smudged or soiled documents without large percentages of error has been designed. However, the repeated or recycle use of such complex and expensive equipment or systems often cannot be justified because of cost. Use of a costly system may be justified for a single pass, but to tie up the equipment for repeated passes of the same documents may not be economically justifiable.

The present invention, therefore, is directed to a solution of the problem of relieving expensive and complex systems of the necessity for repeated passes of the same documents. According to the present invention, a simple and clear coding system, such as a bar code, is printed at high speed in clear and definitely identifiable form on each document preferably during the first pass of the document. Subsequent processing operations may then be carried out in relatively simple equipment under control of this bar code. This makes it possible to use faster sorting machines, under control of inexpensive code readers, for subsequent processing of the data. Thus, documents imprinted with alpha-numeric characters may be rapidly encoded, the coding being placed in substantially error-free form on the same documents without mutilation thereof. Thereafter, the information so encoded can be read in such a way as to permit later high speed and low cost sorting and other processing in single or especially in multi-pass operations.

SUMMARY

A complex optical character recognition system generates primary signals representative of human readable intelligence bearing indicia on a document. The primary signals, or such part thereof as is needed, are then transformed into a simplified code, such as a bar code or a multiple bar code, to control a high speed printer or marking device. The latter records the bar code data on the document itself while the document travels through the system at high speed. The recording medium preferably is a unique or at least uncommon marking substance, such as a fluorescent ink. In one form, the documents are fed at high speed askew the direction of travel. By controlling application of marking substance with the rate of document travel, rectilinear parallel bars preferably are printed or recorded on the document. The bars may be and preferably are oriented parallel to two of the edges and perpendicular to the direction of travel of the document, for subsequent convenience in handling.

In one aspect, particles of writing fluid are charged and by an applied electrostatic field, suitably coordinated with the document travel speed and direction, to place marks on the document surface with the desired orientation. The simple bar coded data thus recorded may then be used further for sorting, classifying, and/or further data processing of the documents. Preferably, the marking material for the bar code is a fluorescent marking material, e.g., an ink, which can be radiated, activated and the light emanating therefrom filtered to pass only a unique dominant wavelength. Thus the newly applied coded data can be sensed to the exclusion of extraneous markings, even markings in the same color, so as to avoid errors due to incidental or irrelevant markings or smudgings on the documents.

After the documents are encoded, a simple and relatively inexpensive bar code reader operable at very high speed can be employed for further sorting, data gathering, etc. Thus, it is possible to relieve the complex and costly mechanisms used on the first pass of routine recycling and subclassifying which otherwise might be necessary.

THE DRAWINGS:

In the accompanying drawings, preferred systems are shown in simplified form.

Figure 1:
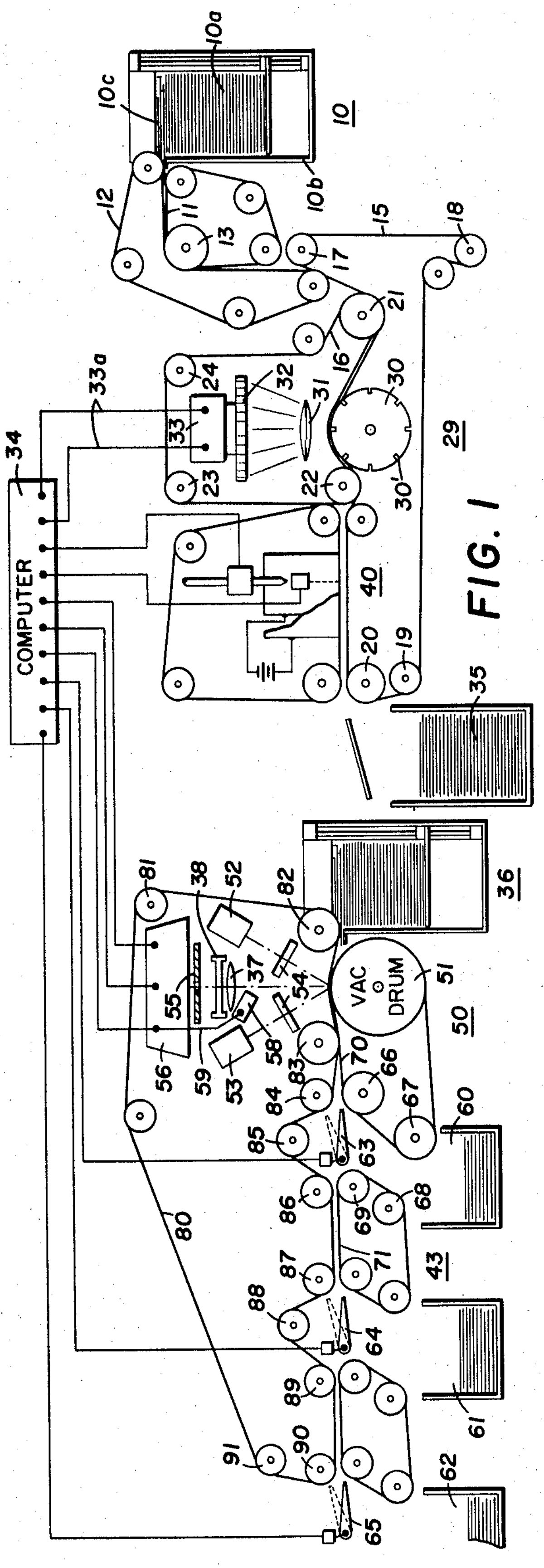
FIG. 1 shows a partly diagrammatical view in elevation of a system incorporating the present invention.

THE PREFERRED EMBODIMENT:

As shown in FIG. 1, a document feeder 10 containing a stack of documents **10*a* in a magazine 10*b* from which the documents are fed serially by suitable feeder means 10*c* to the bite between a pair of high speed travelling belts or tapes 11 and 12. The document feeder 10 preferably will be of the type illustrated and described in U. S. Pat. No. 3,300,207. Tapes 11 and 12 carry each document singly over a guide roller 13 and into the bite between other tapes or belts 15 and 16, which are driven and guided respectively by rollers 17, 18, 19 and 20, and by rollers 21, 22, 23, 24**, etc. Subsequent belts or tapes may be employed for carrying the document further through the apparatus, as will be explained below.

The documents are first transported serially to a reading unit 29 where they are passed over a vacuum drum 30 arranged with numerous small openings 30' as to hold the document securely to its surface. This drum is positioned beneath a suitable lens 31 which focuses images of symbols on the document onto a retina 32. The latter has a large number of photocell elements, as is well known in the art, for scanning in detail and with high resolving power all symbols on the document as it passes by. The retina 32 and its associated apparatus preferably is of the type manufactured and sold by Recognition Equipment Incorporated of Dallas, Tex. and identified as Electronic Retina Computing Reader Model IV. Photocells in retina 32 pass their input to electronic recognition circuitry 33 of known type where the sensed data are analyzed and the results passed through lines **33*a* to a computer 34. The computer produces output signals which vary in magnitude for control of a writer 40. Electrical charges are impressed on droplets or particles of ink, or other writing fluid in writer 40** where the charges are dependent upon the computer output signals. The writing fluid may be fed through a nozzle under pressure to produce a fine stream of liquid. The liquid stream is broken up into fine drops or particles for travel through a charged field onto the document. The varying charges on the particles cause varying deflections thereof as they move toward the document. In this manner, the complex symbols on the document are read, translated into a simple bar code and written as a bar code on the same document while in continuous motion passing through the system.

The writing fluid applied to the document in the form of bars, or groups of short straight parallel lines, dry almost instantly and the document bearing them passes on to a document stacker 35.

If desired, the encoded documents may be passed directly into the succeeding units of the system next to be described. Generally, however, they are collected in stacker 35 and later transferred to a bar code reader which in general will read documents at a higher speed than reading unit 29.

A second document feeder 36 feeds documents at high speed to a bar code reader 50. The latter includes a perforate surfaced vacuum or suction drum 51 much like drum 30. Each document is exposed to appropriate light sources 52,53, which may include ultraviolet or other specially selected light sources, filtered appropriately by filter 54, to select light suitable to bring out certain characteristics of the writing fluid. The resulting reflected or radiated light passes through a lens 37 and a filter 38 to sensing device including a slotted plate 55 through which light representing the bar code bits pass to be sensed and analyzed by a decoder 56. The filter 38 preferably passes a narrow band of light which uniquely identifies the bar code data and prevents confusion with other matter which may be on or in the document. The data thus simply and rapidly sensed may be fed back to computer 34 or to another computer for control of the sorting of the documents, bearing their bar code impressions. Sorted documents drop into sorting bins 60, 61 and 62 (and others not shown) under control of conventional sorting equipment which includes deflectors 63, 64 and 65.

A lens 37 may be dichroic to transmit light of one color, e.g., red, through the slit in plate 55 while reflecting light of another color, e.g., green, to a separate code analyzer 58, which transmits its data through line 59 to unit 56. In this way, two or more parallel rows of bar coded data can be analyzed simultaneously without confusion.

It will be understood that suitable supplemental conveyors 70, 71, etc., guided and moved by rollers 66, 67, 68, 69, etc., will carry the documents through the system in cooperation with overhead straps or conveyors 80 which are guided around rollers 81, 82, 83, 84, 85, 86, 87, 88, 89, 90, 91, etc.

The dividers or deflectors 63, 64 and 65, described above, operate to direct documents to the respective sorting bins 60, 61 and 62 and are operated in conventional manner on signals from the controlling computer, as is well known in the art.

Figure 2:
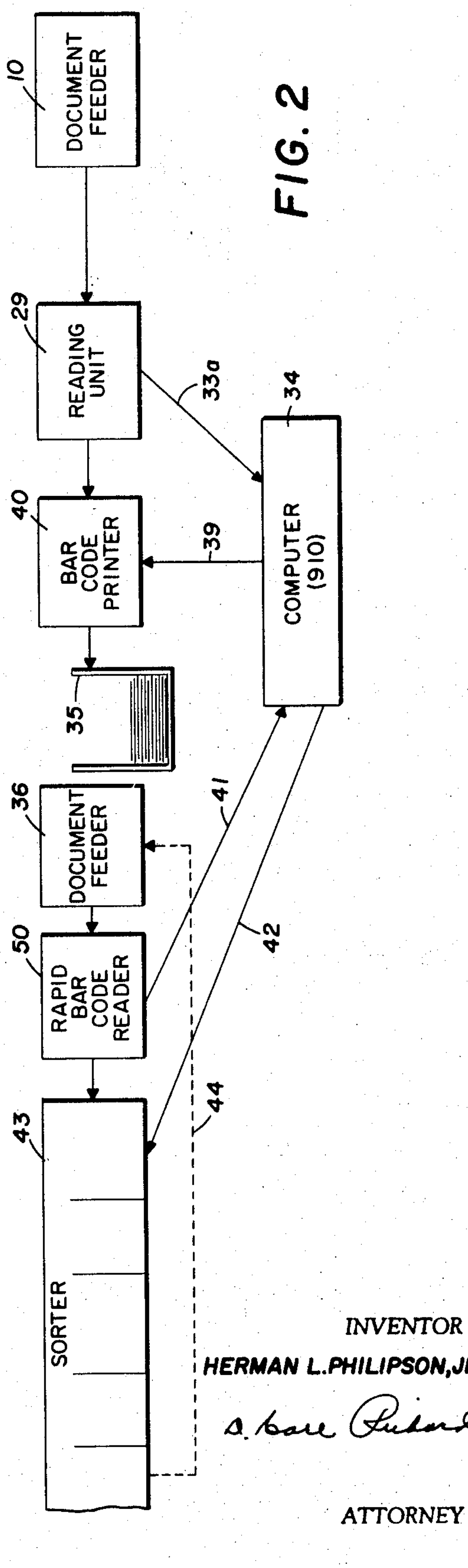
FIG. 2 is a block diagram illustrating the general manner and preferred sequence of operations.

The operations above described are shown in simplified form in FIG. 2. The first document feeder 10 passes the documents to the reading unit 29 from which data are sent through channels 33a to computer 34. The documents pass on to the bar code printer 40 where the bar code, i.e., groups of spaced bars are printed or otherwise applied under control of signals on channel 39 leading from the computer 34. From the bar code printer 40, the document passes on to the bar code reader 50, but is preferably accumulated with others in stacker 35.

Documents are placed in the high speed feeder 36 and are then fed to the rapid bar code reader 50. The latter reads the bar coded data and transmits signals on channels 41 back to the same computer 34, or to a separate computer if desired. The signals are handled in the computer to direct the sorting mechanism 43 through line or connection 42. The sorting mechanism 43 is of well-known type and operates in conventional manner. The documents may then be recycled from the bins of sorter 43 back to feeder 36, as indicated by line 44, group by group, for repeated processing, as many times as may be desired. This makes it unnecessary to handle the documents in the complex, costly, usually slower reading unit 29.

It will be understood that the document feeder 10 may be of any suitable conventional type, and not necessarily limited to the type shown in FIG. 1.

The bar code printer 40 which operates under control of the computer 34 has some important aspects described in detail below.

Figures 3, 4:
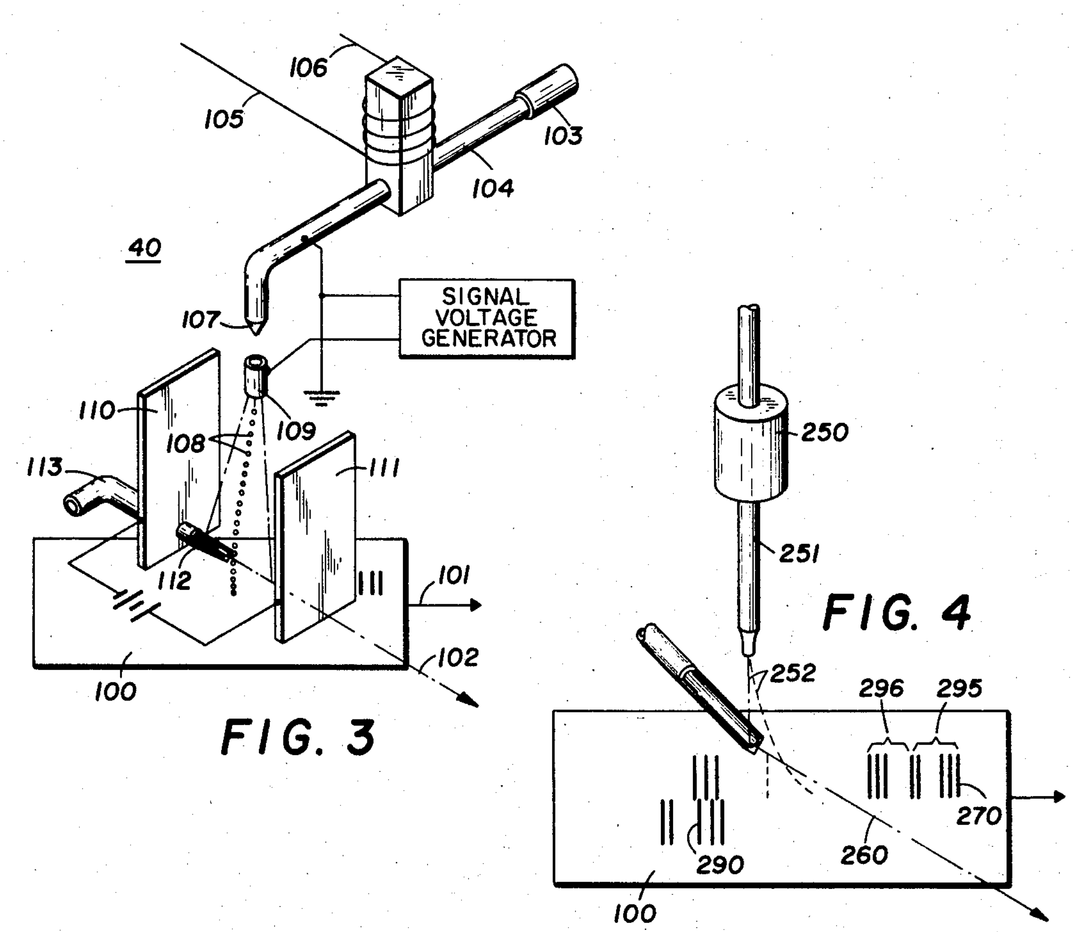
FIG. 3 is a diagrammatic view, showing certain elements in perspective, of a system for applying a writing fluid to a document travelling at high speed to record coded bar data thereon.
FIG. 4 shows a modification of the apparatus of FIG. 3.

Referring now to FIG. 3, a document 100 travels at high speed along a line and direction indicated by the arrow 101. Writer 40 arranged at a suitable angle indicated by arrow 102 is askew to the direction of document travel. Writer 40 comprises a slender conduit or tube 103 through which fluorescent ink or other suitable writing fluid is fed under pressure. The preferred writing fluid is a fluorescent ink which responds under illumination in the bar code reader 50 to emanate certain wavelengths or frequencies of light which are either unique or are not likely to be duplicated in the paper or in other irrelevant markings on the document. The writing fluid passes through a nozzle or conduit 104 which is under control of a suitable high frequency, low amplitude vibrator mechanism, such as the magnetostrictive device 105. This device is electrically operated at an appropriate high frequency, for example, 25 to 100 kilocycles per second, or more, by a signal applied to the winding 106. This signal may be applied from any suitable oscillatory source. The nozzle 104 terminates in a tip 107 having a fine opening, e.g., of about 0.001 inch diameter, through which a very fine stream of writing fluid is forced. The writing fluid may emerge as an extremely fine continuous stream of the order, for example, of 0.001 inch in diameter or less, or may emerge discontinuously. Because of the high frequency vibration, it is assured that the flow of fluid is broken into very small or fine droplets, indicated at 108. A signal voltage from the appropriate computer is applied with one terminal attached to the nozzle 104 and the other to a hollow guide 109 through which the train of droplets 108 must pass. The signal voltage preferably will vary from 0 to about 350 volts for each cycle, i.e., for each bar or bit. Such limits are not particularly critical. As the droplets fall by gravity or are propelled under suitable pressure or force as applied to tube 103, they pass through an electrostatic field created by the charges on two spaced plates 110 and 111 to which an appropriate voltage is applied. This voltage may be of the order of ± 2,000 to ± 20,000 volts. A workable range for such voltage is from about ± 2,000 to ± 8,000 volts relative to ground potential. Uncharged particles of writing fluid are not affected by the electrostatic field so that they flow or fall without substantial deflection into a waste trough 112 from which they may be drained through tube 113. Thus, if no charge is applied to a particle or droplet, it does not mark the document. The amount of writing fluid so consumed is small and continuous flow preferably is maintained to avoid mechanical problems and/or plugging of the very fine nozzle 104. A suitable writing fluid will dry rapidly partly because the droplets are extremely small. Thus, when no charge is applied to droplets, no print or marking is made on the document. However, upon application of a signal voltage to the tube 109, the droplets are charged. As the voltage on tube 109 increases, droplets are individually charged more and more highly and are each deflected, to an increasing extent, by the electrostatic field between plates 110 and 111 as they fall on the document 100. If the document 100 were standing still, the bars formed by a succession of droplets deflected more and more would fall along a diagonal direction across it, as indicated by the arrow 102. The rate of deposition of droplets is coordinated, however, with the rate of travel of the document so that due to such travel, the bars formed by such a succession of charged deflected droplets are oriented parallel to the shorter edges of the document or perpendicular to its travel direction 101.

It will be understood that it is particularly desirable to have the bar codes parallel to an edge of the document, or perpendicular to its direction of travel, so that they can be read cleanly and singly as they pass through or across the narrow slit field of the bar code reader 50.

In FIG. 4, a modification of the marking or printing apparatus is shown, wherein the general arrangement is similar to that of FIG. 3. However, in this case, instead of using a magnetostrictive device such as 105, a piezoelectric crystal 250, suitably activated or oscillated (by circuitry not shown but of well-known type) is employed to impart the desired high speed vibration, e.g., 48 kilocycles per second, in a typical case, to the ink needle or duct 251. As in the former case, the writing fluid is forced through the tube 251 under pressure, and the high frequency, low amplitude vibration breaks it up into extremely small droplets 252 which are propelled at suitable velocity and are deflected serially and increasingly, for a single bar group, in an electrostatic field produced as in FIG. 3, in such a way as to apply the desired bar markings or code elements 270 to the document. The alignment of the markings on the document, it is emphasized, is a composite of the velocity of travel of the card and the direction of fluid deflection due to the electrostatic field.

In some cases, the number of characters desired to be bar coded is too great to be distinguishable when aligned in the single row of elements 270, FIG. 4. In such cases, an additional row or column of bar code elements or bits 290 may be employed. Such data may be imprinted by two printing units like those of FIG. 3 or FIG. 4, in two different dominant colors or in colors having suitable components for reflection and sensing. Thus, the dichroic lens 37 of FIG. 1 can be used to sense the two bands of data in a single pass, if desired.

The arrangement for bar coding preferably is such that the characters or bars can be applied in groups of such number, character, spacing, etc., as to identify uniquely the various data characters, numerical, alphabetical, etc., which is desired to be encoded. With simple numerical data, for example, as few as about four bars, or combinations of bars and spaces, may be quite adequate. However, for more complex systems, e.g., alpha-numeric, it may be necessary to use more bar-space groups. In FIG. 4, two groups 295 and 296 of six bars or unit elements or bits are shown. Elements 295 and 296 in a typical situation may be applied at a rate of about 6,000 per second, that is, applying the equivalent of 1,000 characters per second to the document. In order to do this, and assuming that eight droplets are employed for a single bar, which is a typical example, it is necessary to be able to apply 48,000 very tiny droplets per second. Hence a vibration or oscillation rate of 48 kilocycles per second must be applied to the magnetostrictive device 105, FIG. 3, or to the piezoelectric crystal 250, FIG. 4, for this particular example. The frequency employed, of course, may be considerably greater or less than this, depending on the speed of document handling. The above specific figures apply to our embodiment and are given by way of example only.

Figure 5:
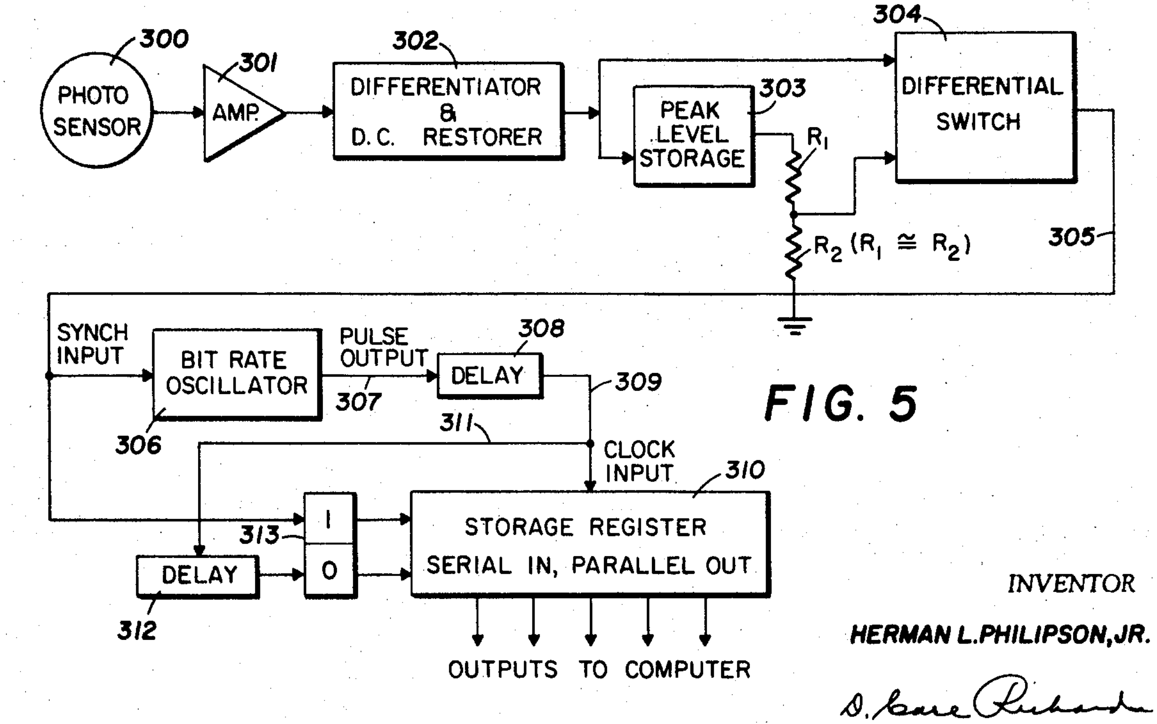
FIG. 5 shows in diagrammatic form a system by which the bar data may be read out and used for sorting, classifying and other data handling of documents which have been printed with bar code.

Referring now to FIG. 5, a system is shown for sensing the bar data applied to the document 100 by the mechanisms of FIGS. 3 or 4. This bar code reader 50, as shown diagrammatically, consists of a photosensor 300 which picks up a signal from the bar coded data and transmits it to an amplifier 301. From the amplifier, the signal passes to a differentiator and direct current restorer 302. From there, the signal may be divided to pass both through a peak level storage device 303, which insures a suitable operating level for distinguishing the true data from spurious data such as "-noise", or smudges, soiled areas, and the like on the document 100, and also to the differential switch 304.

From the latter, the signal passes by way of line 305 to a synchronized input which carries it to a bit rate oscillator 306. The bit rate oscillator senses the elements of the signal. The oscillator preferably is synchronized with the input signals from the photosensor, but in case the pulse output through line 307 is not exactly synchronized, a delay 308 is interposed to obtain appropriate synchronization. From the delay 308, the signal passes by way of a line 309 to the clock input of a storage register 310 preferably of the serial in, parallel out type. However, the signals also are fed to a flip-flop device of type well known, shown at 313 with a suitable delay unit 312 interposed to insure appropriate operation.

From the storage register, the data are fed in parallel to the computer which, as noted above, may be either the computer 34, FIG. 2, or a separate unit, as required, for controlling the sorter 43 of FIG. 2, or the sorter elements 63, 64, etc., of FIG. 1.

It will be understood that the system described is applicable to the handling of numerous and various types of documents. For example, thin flexible sheets such as bank checks, etc., may readily be handled, as well as thicker card stock. Imprinting thereon with fluorescent ink will not in any way injure the document. It can readily be distinguished from the usual endorsements and stampings thereon because of preferably unique florescent character of the writing fluid by which the bar data are encoded. The specific units for coding, decoding, etc., are known and need not be described in detail. The system is particularly applicable to large volume accounting systems involving large numbers of individual documents, as used, for example, in billing systems for large numbers of customers. While particularly suitable for those where a group of items are to be collected for each customer using a credit card in retail sales, the system can be used also for many other purposes.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system for processing documents containing human readable intelligence, the combination comprising:

an optical character reader for reading alphanumeric data on a document presented thereto and for generating primary signals representative of said data, computer means responsive to the primary signals for converting the pertinent elements thereof into a set of signals representative, in a simplified coding system, of said elements, means for projecting droplets of a writing fluid to said document under control of said set of signals for application to the same document as presented to said optical character reader, machine readable, encoded visible symbols representing said pertinent elements while the document moves relative to said optical character reader, a document transport means including a rotating drum and feeder means for bringing documents into said system serially to said optical character reader, and a second document transport means extending from the rotating drum to said means for projecting droplets of writing fluid for uninterrupted travel of a document from the approach to said drum to a point beyond the means for projecting droplets of a writing fluid.

2. The combination according to claim 1 wherein the means for applying a writing fluid includes an element for forming, projecting and electrically charging fine particles of writing fluid and means for applying an electrostatic field for controllably deflecting said charged fine particles from their normal path of projection to produce bar coded elements on the document.

3. The combination according to claim 1 wherein means are provided for reading an utilizing the simple coded elements for further processing of the document.

4. The combination according to claim 1 wherein the means for applying a writing fluid to the document includes a pressurized source of a fluid marking substance, a conduit therefor, a high frequency vibrating device for said conduit operable at high frequency and low amplitude for breaking the fluid up into very fine droplets, and means for applying differential electrical charges to said droplets in sequence to cause them to be deflected progressively thereby to form bar characters on said document.

5. The combination according to claim 4 wherein the document is fed at an angle askew to the normal path of said droplets in order to form bar code elements perpendicular to the path of travel of said document.

6. In a system for coding and processing documents containing human readable intelligence, the combination which comprises:

optical character reading means for reading alphanumeric data on a document as it is moved past a reading station, means responsive to said optical character reader for converting pertinent elements of said alphanumeric data into a simplified indicia code, writing means responsive to said means for converting data for applying a writing fluid to the same document in encoded machine readable visible form, the simplified code representing said pertinent elements as said document moves relative to the optical character reader, a document transport means including a rotating drum and feeder means for bringing documents into said system serially to said optical character reading means, and a second document transport means extending from the rotating drum to said writing means for uninterrupted travel of a document from the approach to said drum to a point beyond the writing means.

7. A method for processing documents containing human readable intelligence in a system including a document supply transport line leading serially through a reading station and a printing station, an optical character reader at the reading station, an ink jet printer at the printing station, and computer means which comprises the steps of:

optically reading the alphanumeric data on a document as it moves past the reading station, generating a set of primary signals representative of the alphanumeric data as read at the reading station, translating signals by said computer means from said set representative of primary elements thereof into a simplified code signal representative of said elements, applying a writing fluid to said document to produce visible symbols representative of simplified code signals as the document passes the printing station, and transporting the documents from the reading station to the printing station.

8. The method according to claim 7 wherein the simple code is applied by breaking up a liquid marking fluid into droplets in accordance with said simplified code signals and displacing said droplets from their normal path by differential electrical charging forces, thereby to apply multiple droplets in single file groups.

9. A document reencoding system which comprises:

a rotating drum, a document supply transport line leading serially through a reading station and a printing station, means for moving documents serially in said line in a curved path around a curved face of said drum in uninterrupted travel through said printing station, optical character processing means at the reading station for sensing alphanumeric characters on documents moving around said drum and converting to a simplified code the information represented by said alphanumeric characters, an ink jet printer along the path of said documents downstream of said drum and at said printing station, and means coupling said processing means to said printer to impress on documents while at said printing station simplified indicia corresponding to said code.

10. A document reencoding system as set forth in claim 9 wherein said rotating drum includes an arrangement of openings coupled to a vacuum supply to hold a document securely to the drum surface when at the reading station.

11. A document reencoding system as set forth in claim 10 wherein said transport line includes a continuously moving flexible belt for imparting to a document continuous motion through the reading station and subsequently through the printing station.

12. A document reencoding system which comprises:

a document transport means including a rotating drum with means for bringing documents into said system serially to a reading station into a configuration corresponding with and moving at the surface speed of said drum, an optical character recognition means for interpreting alphanumeric data on each document as it passes by said drum and for converting said alphanumeric data to simplified bar code signals representative of said alphanumeric data, a second document transport means extending from said drum to a printing station for uninterrupted travel of said documents from the approach to said drum to a point beyond said printing station, an ink jet printer at said printing station for applying bar codes selectively to documents moving from said drum through said printing station, and means for energizing said bar code printer in response to the bar code signals from said recognition means to impose bar codes to said documents at said printing station.

* * * * *